United States Patent [19]

Steigerwald

[11] Patent Number: 5,451,962

[45] Date of Patent: Sep. 19, 1995

[54] BOOST REGULATED CAPACITOR MULTIPLIER FOR PULSE LOAD

[75] Inventor: Robert L. Steigerwald, Burnt Hills, N.Y.

[73] Assignee: Martin Marietta Corporation, Moorestown, N.J.

[21] Appl. No.: 296,579

[22] Filed: Aug. 26, 1994

[51] Int. Cl.6 .................. G01S 7/282; H02M 3/335
[52] U.S. Cl. .................. 342/175; 363/71; 363/17; 323/266
[58] Field of Search .................. 342/175, 198; 363/17, 363/71, 98, 132; 323/222, 224, 266

[56] References Cited

U.S. PATENT DOCUMENTS

| | | | |
|---|---|---|---|
| 4,163,926 | 8/1979 | Willis | 315/408 |
| 4,169,241 | 9/1979 | Peer et al. | 315/411 |
| 4,234,827 | 11/1980 | Willis | 315/408 |
| 4,686,615 | 8/1987 | Ferguson | 363/17 |
| 4,686,617 | 8/1987 | Colton | 363/56 |
| 4,761,722 | 8/1988 | Pruitt | 363/17 |
| 5,038,264 | 8/1991 | Steigerwald | 363/21 |
| 5,162,982 | 11/1992 | Mentler | 363/26 |

Primary Examiner—Ian J. Lobo
Attorney, Agent, or Firm—W. H. Meise; C. A. Nieves; S. A. Young

[57] ABSTRACT

A capacitance multiplier/regulator (FIG. 1) stores charge at high voltage across a capacitor (22,32), and capacitance-multiplies current to a load (100) by step-down transformers (26,36), controlled switches (24,34), and rectifiers (28,38). The switch pairs (24a,24b;-34a,34b) each switch in antiphase, but the switching phase between the pairs is controlled (FIG. 5) in a feedback manner to controllably generate a voltage across a transformer primary winding ($14_p$), which couples a feedback-controlled alternating voltage across secondary winding ($14_s$). The alternating voltage is added to the unregulated voltage by a rectifier (18,20), so the bus voltage is controllably greater than the unregulated input voltage. The feedback controls either the bus voltage or the load voltage. Stress on the switches is reduced by preventing capacitor recharge during a load pulse.

10 Claims, 5 Drawing Sheets

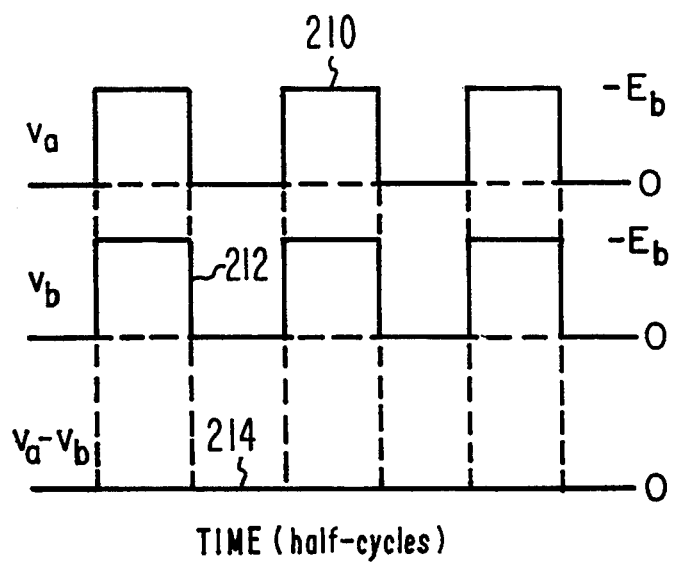
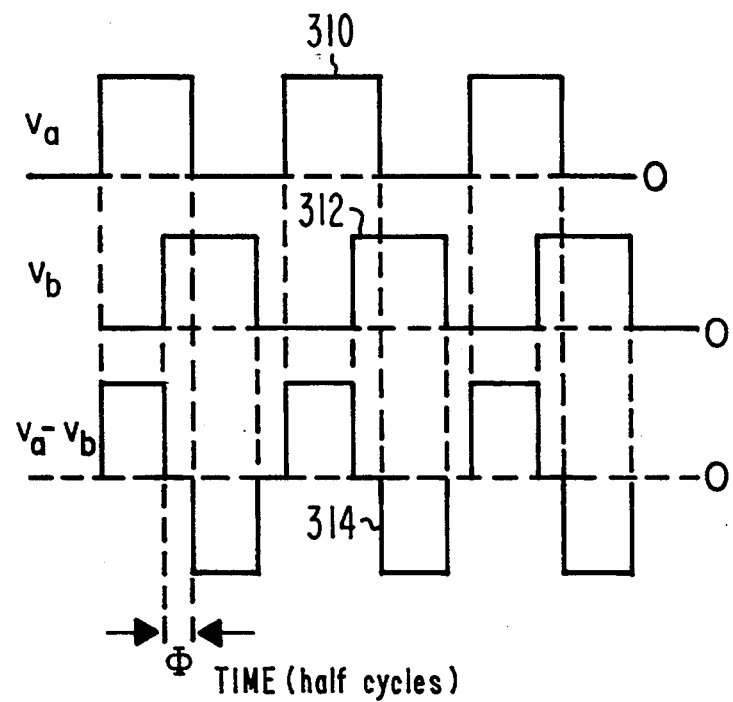

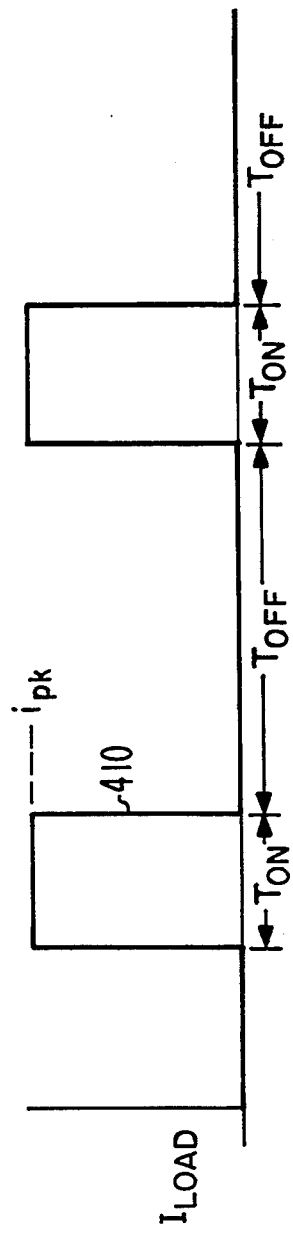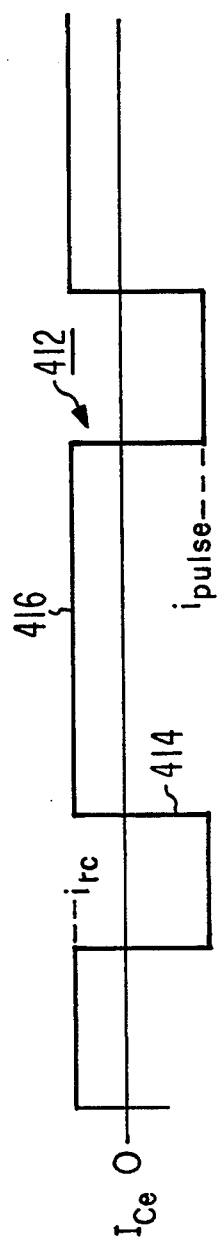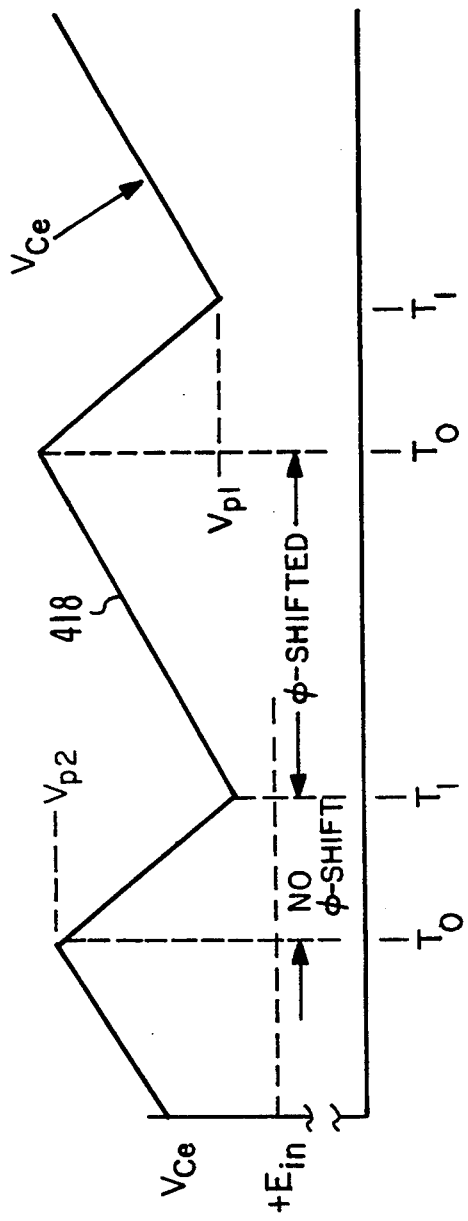

BOOST REGULATED CAPACITOR MULTIPLIER FOR PULSE LOAD

FIELD OF THE INVENTION

This invention relates to direct-voltage power supply regulators, and more particularly to such regulators which include capacitor multipliers suitable for low-voltage switched loads, such as solid-state pulse radar transmitters.

BACKGROUND OF THE INVENTION

The advent of active phased-array transmitting antennas for uses such as pulse radar has increased the need for power supplies capable of supplying large amounts of peak power at low voltages. The relative inefficiency of solid-state DC-to-RF converters increases the amount of energizing power required relative to the radiated radio-frequency (RF) energy, by comparison with high-voltage vacuum-tube technology. The long life of solid-state devices makes the tradeoff of efficiency for long life attractive. In this context, the term radio-frequency includes ultra-high frequencies (UHF), microwaves, millimeter-waves, and other wavelengths as appropriate. The term DC refers to direct current, also known as direct voltage, which is normally used to energize active devices such as transistors and diodes.

In a pulse radar, the DC-to-RF converters are often turned on for a few microseconds, followed by a period during which they are inactive, during which period the radar system "listens" for echoes. The ratio of on-to-off time is known as the duty cycle, often given in percent. The duty cycle can range from less than 1% for a short-range, relatively low-power radar to 10% or more for a long-range, high power radar. In some cases, the duty cycle may change during operation, as described, for example, in U.S. Pat. No. 5,115,244, issued May 19, 1992 in the name of Freedman et al. The performance of solid-state devices used for high-frequency operation is often critically dependent upon the applied energizing voltage. For this reason, the sources of energization voltage are ordinarily regulated, to maintain a particular voltage for each solid-state device.

All electrical power supplies or power sources have an inherent internal resistance. This internal resistance reduces the output voltage of the supply as the load current increases, as a result of the voltage drop across the internal resistance. The internal resistance can be artificially reduced by negative or degenerative feedback systems, well known in the art. When vacuum-tube radar systems are operated in a pulse mode, the relatively high operating voltage results in a relatively low current consumption during the pulse. It has been common to store sufficient electrical charge locally to supply the current for the current pulses. The charge storage device is a capacitor. Sufficient capacitance is provided so that the charge required by the vacuum-tube device can be supplied during the pulse, without excessive drop of the high voltage. When solid-state DC-to-RF converters are energized, tens or even hundreds of amperes of electrical current may be required at a fixed voltage, much lower than that required by the vacuum-tube device. It may be too expensive or too bulky to provide sufficient capacitance to provide the very large current at low voltages for the solid-state devices of an active phased-array antenna.

SUMMARY OF THE INVENTION

A capacitance multiplying direct voltage regulator for generating, from an unregulated direct voltage source, a regulated direct voltage across a capacitance, and for capacitance-multiplied coupling of the regulated direct voltage to a load. The regulator comprises a first transformer, which includes a primary winding and a secondary winding. One terminal of the secondary winding is coupled to a first terminal of the source of unregulated direct voltage. A first unidirectional current conducting arrangement is coupled to at least another terminal of the secondary winding of the first transformer and to the regulated relatively high voltage bus. The unidirectional current conducting arrangement may be a diode or rectifier, or a bridge arrangement of rectifiers, for preferentially conducting current in a particular direction between the source of unregulated voltage and the regulated relatively high voltage bus. A capacitor, which in one embodiment may be a split capacitor including first and second series-connected capacitors with a tap therebetween, is coupled between the regulated relatively high voltage bus and a second terminal of the source of unregulated voltage, which may be ground or other reference potential. First and second controllable switches, such as FETs, are series-connected, and including a tap at their juncture. The first and second series-connected switches are coupled between the regulated relatively high voltage bus and the second or reference terminal of the source of unregulated voltage. Third and fourth series-connected controllable switches, which may also be FETs, include a tap at the juncture therebetween. The third and fourth series-connected switches are coupled between the regulated relatively high voltage bus and the second or reference terminal of the source of unregulated voltage. The first terminal of the primary winding of the first transformer is coupled to the tap associated with, or at the juncture of, the first and second controllable switches, and the second terminal of the primary winding of the first transformer is coupled to the tap associated with the third and fourth controllable switches. A switching control arrangement is coupled to the first, second, third and fourth controllable switches, for switching the first and second controllable switches in mutual antiphase at a predetermined frequency, and for switching the third and fourth controllable switches in mutual antiphase at the predetermined frequency, but at a phase which is controlled, in response to an error signal, relative to the phase of the switching of the first and second controllable switches, whereby, when the phase relation is an in-phase condition, no voltage appears across the primary winding, and the secondary winding of the first transformer has no voltage induced thereacross, and the voltage, which may be a regulated voltage, of the relatively high voltage bus has approximately the same magnitude as the unregulated voltage, or at least tends toward the unregulated voltage, and whereby, when the phase relation is other than the in-phase condition, a voltage appears across the primary winding of the first transformer, which is summed with the unregulated voltage to produce the voltage on the relatively high voltage bus. In one embodiment, the voltage on the relatively high-voltage bus is greater than the unregulated voltage. A step-down transformer is provided, which includes a primary winding and a secondary winding; the primary winding is connected to the tap between the first and second controllable switches, whereby a first alternating voltage, having a magnitude dependent upon the regulated voltage, is applied across the primary winding of the step-down transformer in response to the mutually antiphase switching of the first and second controllable switches. In one embodiment, the other terminal of the primary winding of the step-down transformer is connected to a tap between the first and second series-connected capacitors. However connected, a second alternating voltage, which has a peak magnitude which is relatively lower than the voltage on the relatively high-voltage bus, is induced in the secondary winding of the step-down transformer. A second unidirectional current conducting, diode or rectifier arrangement is coupled to the secondary winding of the step-down transformer and to the load, for coupling direct current to the load in response to the relatively lower second alternating voltage. An error signal generating arrangement is coupled to the switching control arrangement and to either the relatively high-voltage bus or to the load, for comparing the voltage across the load or the bus with a reference, for generating the error signal with a phase which forms a degenerative feedback loop tending to maintain the direct value of the load or bus voltage near a fixed value.

In a particular embodiment of the invention, the secondary winding of the first transformer is center-tapped, and coupled to the first terminal of the source of unregulated direct voltage. In this particular embodiment, the first unidirectional current conducting arrangement consists of at least first and second rectifiers coupled to the first and second output terminals of the secondary winding of the first transformer. In another embodiment, the secondary winding of the step-down transformer includes a center tap and first and second output terminals. The center tap of the secondary winding of the step-down transformer is coupled to a first or reference terminal of the load. Another embodiment of the invention includes a second split capacitor, with third and fourth series-connected capacitors defining a tap therebetween. The second split capacitor is coupled between the relatively high voltage bus and the second or reference terminal of the source of unregulated voltage. A second step-down transformer is provided, which includes a primary winding and a secondary winding. The primary winding of the second step-down transformer is connected to the tap between the third and fourth series-connected capacitors and to the tap between the third and fourth controllable switches, whereby a third alternating voltage, which may be identical to the second alternating voltage, and having the magnitude dependent upon the voltage on the relatively high voltage bus, is applied across the primary winding of the second step-down transformer in response to the mutually antiphase switching of the third and fourth controllable switches, and a fourth alternating voltage, relatively lower in peak magnitude than the relatively higher direct voltage on the bus, is induced in the secondary winding of the step-down transformer. A third unidirectional current conducting arrangement is coupled to the secondary winding of the second step-down transformer and to the load, for coupling current from the secondary winding of the second step-down transformer to the load in response to the fourth relatively lower alternating voltage. In this way, the current for the load is stored as charge at the relatively higher voltage, and is provided to the load by way of the capacitance multiplier, which includes one or more transformers coupled to the high-voltage storage capacitor by a path without significant inductance, which path is switched at a high frequency and with a 50% duty cycle, so that the high-voltage capacitor is always coupled to the low-voltage load by the turns ratio of a transformer. The switching circuit which is required for operating the capacitance multiplier is arranged and controlled in such a fashion that it also performs the voltage regulation. In another embodiment of the invention, the load on the switching transistors is minimized by separating the times of load supply and capacitor recharge.

DESCRIPTION OF THE DRAWINGS

FIGS. 2a, 2b, and 2c represent the voltages generated by the switched bridge of FIG. 1 under in-phase conditions;

FIGS. 3a, 3b, and 3c represent the voltages generated by the switched bridge of FIG. 1 under partially out-or-phase switching conditions;

FIG. 4a represents two sequential load current pulses, FIG. 4b represents the current in a high-voltage capacitor of the arrangement of FIG. 1 as a result of charging operation of the switching arrangement of FIG. 1, and the current discharge which occurs during the load pulses, and FIG. 4c represents the voltage across the high-voltage capacitor of FIG. 1 as a result of the charge and discharge of FIG. 3b;

DESCRIPTION OF THE INVENTION

Figure 1:
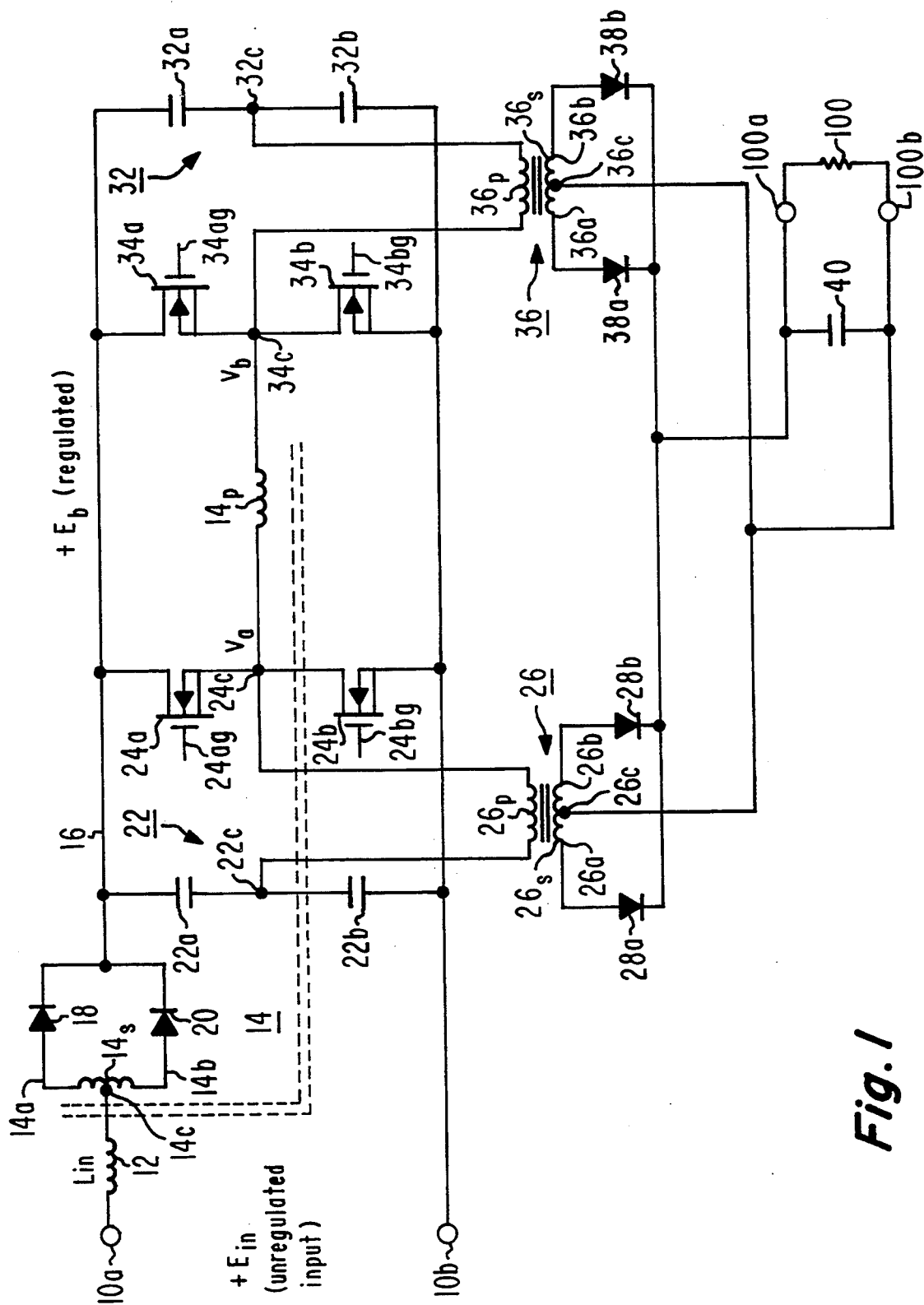
FIG. 1 is a simplified schematic diagram of the power portions of a switching arrangement according to the invention including a transformer with a primary winding coupled across the terminals of a switched bridge, and the switched bridge coupled across a high voltage storage capacitor.

In FIG. 1, an unregulated direct voltage supply ($E_{in}$) is applied to input terminals 10a and 10b, where terminal 10b may be considered to be ground or a reference potential. Terminal 10a is coupled by an RF choke or input inductor 12, for reducing high-frequency leakage, to the center tap 14c of the secondary winding 14, of a transformer 14. The two outer terminals 14a and 14b of secondary winding $14_s$ are coupled to a bus 16 by unidirectional current conducting devices 18 and 20, respectively, which are represented as diodes. In one embodiment of the invention, as described below, the voltage $E_b$ on bus 16 is regulated. A first split capacitor 22 includes series-connected high-voltage energy storage capacitors 22a and 22b, connected between bus 16 and reference terminal 10b, with a juncture or tap 22c therebetween.

Also, FIG. 1 illustrates a pair of electrical switches in the form of series-connected power FETs 24a and 24b, which are coupled between bus 16 and reference terminal 10b. Series-connected FETs 24a and 24b define a juncture 24c therebetween. FET 24a has a control gate 24ag, and FET 24b has a control gate 24bg. As described in more detail below, FETs 24a and 24b have their conduction controlled in antiphase, so that when one is conductive, the other is nonconductive, and the conduction is further controlled to a 50% duty cycle for each FET of the pair. As a consequence, the voltage $v_a$ at juncture 24c alternates between the reference potential and the bus potential. The primary winding $26_p$ of a step-down transformer 26 of FIG. 1 is connected between juncture 24c of the series-connected FETs and tap 22c between the series-connected capacitors. The voltage at tap 22c is half the voltage $E_b$ at bus 16, assuming that capacitors 22a and 22b are of the same size. Consequently, the primary winding $26_p$ of step-down transformer 26 receives (or has applied to it) a peak-to-peak voltage equal to bus voltage $E_b$, in response to the switching of FETs 24a and 24b. The voltage transformation ratio of transformer 26 is $N_2/N_1$, where $N_1$ represents the number of primary winding turns, and $N_2$ represents the number of secondary turns. The voltage transformation ratio as defined above may be on the order of 50, meaning that the voltage stored on capacitor 22 is 50 times greater than the voltage across secondary winding $26_s$ of transformer 26. Thus, if the voltage stored across capacitor 22 is 1000 volts, the alternating voltage across terminals 26a and 26b of transformer secondary winding $26_s$ will have a peak-to-peak magnitude in the vicinity of ten volts.

A center-tap 26c of secondary winding 26, of transformer 26 of FIG. 1 is connected to a reference terminal 100b of a load, represented as a resistor 100. Those skilled in the art will recognize that the load actually comprises the collector-to-emitter paths of bipolar transistors, or source-to-drain paths of FETs, or the equivalent, which are used to convert DC to RF. Reference terminal 100b may be an RF ground, as known in the art. Terminals 26a and 26b of secondary winding $26_s$ are coupled by further unidirectional current conducting devices in the form of diodes or rectifiers 28a and 28b, respectively, to load terminal 100a, for full-wave rectifying the voltage induced across secondary winding $26_s$, to produce a direct load voltage. Since the secondary winding voltage is in a fixed ratio to the voltage across high-voltage storage capacitor 22, the magnitudes of the voltage across bus 16 and the load voltage are fixedly related.

Control of the voltage on bus 16 of FIG. 1 is accomplished with the aid of a further set of series-connected power FETs 34a and 34b, which have a juncture 34c therebetween. FET 34a has a control gate 34ag, and FET 34b has a gate 34bg. FETs 34a and 34b are controlled, as described below, to switch in mutual antiphase, as described above in conjunction with FETs 24a and 24b. However, while FETs 24a and 24b operate in mutual antiphase at some switching frequency, and FETs 34a and 34b operate in mutual antiphase at the same switching frequency, there is no necessary phase relationship between the switching of the two pairs, and instead the switching phase relationship between the two pairs is controlled, as described in more detail below, to provide regulation.

In FIG. 1, a further split capacitor 32, including series-connected capacitors 32a and 32b, is connected between bus 16 and reference terminal 10b. A tap or juncture 32c lies between capacitors 32a and 32b. A primary winding $36_p$ of a step-down transformer 36 is coupled between tap 32c and juncture 34c. Transformer 36 includes a secondary winding 36, having terminals 36a and 36b, and also having a center-tap 36c. Center-tap 36c is connected to center-tap 26c of transformer 26 and to load reference terminal 100b. Secondary winding terminals 36a and 36b are coupled to load terminal 100a by way of unidirectional conducting devices 38a and 38b, respectively, for generating load current in response to the secondary voltage induced in secondary winding $36_s$. A noise reduction capacitor is coupled across load terminals 100a and 100b. Capacitor 40 has insufficient capacity to provide the charge required to maintain load current during the RF pulse period of the load.

A primary winding $14_p$ of transformer 14 is coupled to juncture 24c between FETs 24a and 24b in FIG. 1, and to juncture 34c between FETs 34a and 34b. Primary winding $14_p$ is energized by the difference between voltage $v_a$ at juncture 24c and voltage $v_b$ at juncture 34c. If switch pairs 24 and 34 are switched in synchronism, with switches 24a and 34a switched into conduction or ON simultaneously, and (at a later time) switches 24b and 34b switched into conduction or ON simultaneously, and switches 24a and 34a switched out of conduction or OFF simultaneously therewith, the voltages at junctures 24c and 34c rise and fall together, and there is no voltage difference across primary winding $14_p$. This condition is illustrated in FIGS. 2a, 2b, and 2c, in which plot 210 of FIG. 1a illustrates voltage $v_a$, plot 212 of FIG. 2b represents voltage $v_b$, and plot 214 represents the zero difference voltage between voltages $v_a$ and $v_b$. The primary winding $14_p$ of transformer 14 is, therefore, without energizing voltage when switch pairs 24 and 34 are switched in-phase.

Plot 310 of FIG. 3a represents voltage $v_a$ for reference, and plot 312 represents voltage $v_b$, resulting from switching controllable switch pair 34 of FIG. 1 relatively advanced in phase, relative to the condition illustrated in FIGS. 3a and 3b, by phase $\Phi$. Plot 314 of FIG. 3c represents the voltage difference between voltages $v_a$ and $v_b$, which appears across the primary winding $14_p$ of transformer 14. As a result of the application of the alternating voltage represented by plot 314 of FIG. 3b to the transformer primary winding, a corresponding alternating voltage, possibly of different magnitude, appears across secondary winding $14_s$ of FIG. 1. The alternating voltage appearing across secondary winding 14, results in a current flow which is rectified by rectifiers 18 and 20, and which results in a greater charge across capacitors 22 and 32. In effect, the alternating voltage appearing across secondary winding $14_s$ is rectified and added to the unregulated direct voltage. The amount of the voltage added to the unregulated voltage depends upon the phase $\Phi$ between the switching of switch set 24 and switch set 34. As described below, the switching is controlled to provide voltage regulation.

FIGS. 4a, 4b, and 4c illustrate load pulse intervals occurring between recurrent times $T_0$ and $T_1$. In FIG. 1, plot 410 represents the load current during two recurrent load intervals, which may be, for example, two recurrent radar pulse transmission intervals. Plot 410 has a peak value or magnitude $i_{pk}$ which is constant in the $T_{ON}$ interval extending from time $T_0$ to time $T_1$, representing the constant current drain occurring during this interval. Plot 410 also has a value of essentially zero in the $T_{OFF}$ interval extending from time $T_1$ to the next following time $T_0$, representing the lack of significant load current when a transmission pulse is not taking place.

Figure 5:
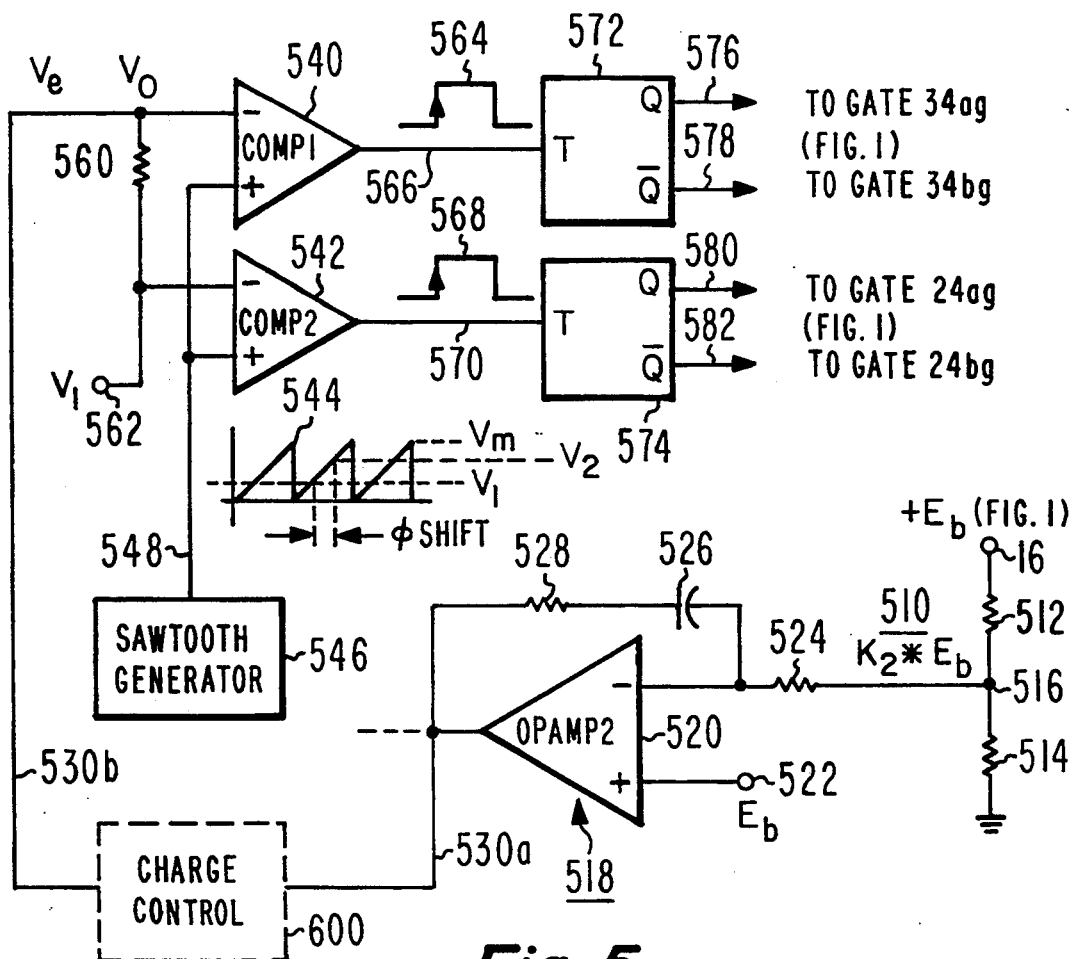
FIG. 5 is a simplified schematic diagram of a control circuit for the arrangement of FIG. 1, in which operation is continuous.

FIG. 5 is a simplified schematic diagram of a control circuit for the gates of the controllable switches of FIG.

1. In FIG. 5, elements corresponding to those of FIG. 1 are designated by the same reference numerals. In FIG. 5, a voltage divider designated generally as 510 is coupled between bus 16 and reference ground, for sensing the bus voltage $E_b$. Voltage divider 510 includes series-connected resistors 512 and 514, which generate a sample of the bus voltage on a tap 516, for application to an error amplifier designated generally as 518. Error amplifier 518 includes a high-gain amplifier 520 with inverting (−) and noninverting (+) input terminals. The noninverting input terminal is coupled to a reference voltage source at a terminal 522. Amplifier 518 generates an amplified error signal. The low-frequency gain of error amplifier 518 is the open-circuit gain of amplifier 520, while changes are amplified with a lesser gain, which lesser gain established by feedback resistor 528 acting against input resistor 524. Loop phase is controlled with the aid of a feedback capacitor 526 in series with resistor 528. The error signal $v_e$ is generated at the output of amplifier 518, and is coupled by way of conductor portions 530a and 530b to a comparator arrangement including comparators 540 and 542.

The error signal from conductor 530b of FIG. 5 is applied directly to the inverting input terminal of comparator 540. Comparator 542 receives a fixed voltage $v_1$ at its inverting input terminal. A resistor 560 connects the inverting input terminals of comparators 540 and 542, for tending to maintain their inputs at same level in the absence of an error signal input. Comparators 540 and 542 receive at their noninverting input terminals, in common, a sawtooth voltage illustrated as 544. Sawtooth signal 544 is generated by a sawtooth signal generator 546, which operates at a frequency much higher than the system pulse load frequency. The sawtooth signal voltage applied to the noninverting input terminal of comparator 542 crosses the reference voltage $v_1$ twice during each sawtooth cycle, once during the slow ramp portion, and once during the rapid sawtooth retrace. The output of comparator 542 will be low (logic 0) so long as the sawtooth voltage is below the reference voltage $v_1$, and high (logic 1) whenever the sawtooth voltage is above the reference voltage. As a result, comparator 542 generates a recurrent rectangular wave, illustrated as 568, on its output conductor 570. Since reference voltage $v_1$ is unchanging, the rectangular-wave output of comparator 542 remains at all times in the same phase relationship with sawtooth wave 544. Rectangular wave 568 is applied to the T input port of a toggled flip-flop (FF) 574, which is triggered between its two stable states on the rising edge of rectangular wave 568. The Q and $\bar{Q}$ outputs of FF 574 are applied by way of conductive paths 580 and 582 to gates 24ag and 24bg, respectively, of FETs 24a and 24b, respectively, for controlling the conductive states of the FETs. Since the Q and $\bar{Q}$ outputs of FF 574 are always in mutual antiphase, FETs 34a and 34b are always controlled for alternate conduction.

Comparator 540 of FIG. 5, as mentioned above, also receives sawtooth waveform 544 at its noninverting input terminal. Unlike reference comparator 542, however, comparator 540 has applied to its inverting input terminal a reference voltage which varies in response to the error signal produced by error amplifier 518. As a consequence, the time at which the sawtooth signal 544, which is applied to the noninverting input terminal of comparator 540, crosses the varying error voltage applied to the inverting input terminal, varies, relative to the corresponding crossing of comparator 542, depending upon the magnitude of the error voltage. This relative time shift between the switching of the two comparators in response to the sawtooth represents a phase shift at the sawtooth repetition rate, and is related to the phase shift Φ illustrated in FIG. 3c. The phase-shifted rectangular wave 564 produced by comparator 540 is applied to the T input terminal of a toggled FF 572. The Q and $\bar{Q}$ outputs of FF 572 are applied by way of conductive paths 576 and 578 to gates 34ag and 34bg, respectively, of FETs 34a and 34b, respectively, for controlling the conductive states of the FETs. Further, as described in conjunction with FIGS. 3a, 3b, and 3c, the magnitude of the phase shift Φ establishes the voltage induced in secondary winding $14_s$, and the voltage which is added to the unregulated input voltage to produce the regulated voltage on bus 16. The described arrangement forms a degenerative or "negative" feedback loop, which tends to maintain the bus voltage near a particular value established by the voltage division ratio of divider 510 compared with the reference voltage applied to terminal 522.

While the control arrangement of FIG. 5 is described as comparing the voltage on bus 16 of FIG. 1 with a reference voltage to generate the error voltage, voltage divider 510 of FIG. 5 may instead be coupled to terminal 100a of FIG. 1, so that the feedback loop directly regulates the voltage across load 100.

As so far described, the arrangement of FIG. 1 in conjunction with the control system of FIG. 5 operates continuously in the feedback mode. Charging of capacitor pairs 22 and 32 of FIG. 1 requires energy in the form of current flow from the unregulated source, through one of diodes 18 and 20, to the capacitors. Since the voltage $E_b$ on bus 16 is regulated under normal operating conditions, the capacitor energy is the sum of energy flowing directly from the unregulated source, and additional energy which is coupled through transformer 14. The energy flow through transformer 14 is controlled by controllable switch pairs 22 and 32, and may be viewed as "flowing" through the switches. In the same manner, the energy flowing to the load 100 by way of transformer 26 may be viewed as flowing through switch pair 22, and the energy flowing to load 100 by way of transformer 36 may be viewed as flowing through switch pair 32. Thus, the switches carry both the load energy (load current referred to the primary winding of transformers 26 and 36) and the voltage regulation or capacitor recharge energy (current referred to the primary winding of transformer 14). Since most of the current drain by the load occurs during the load pulse interval, the switches are most highly stressed during the load pulse interval. According to an aspect of the invention, the switches are controlled to separate the load energy and capacitor recharge intervals, to thereby minimize the stress to which the switches are subjected.

Figure 6:
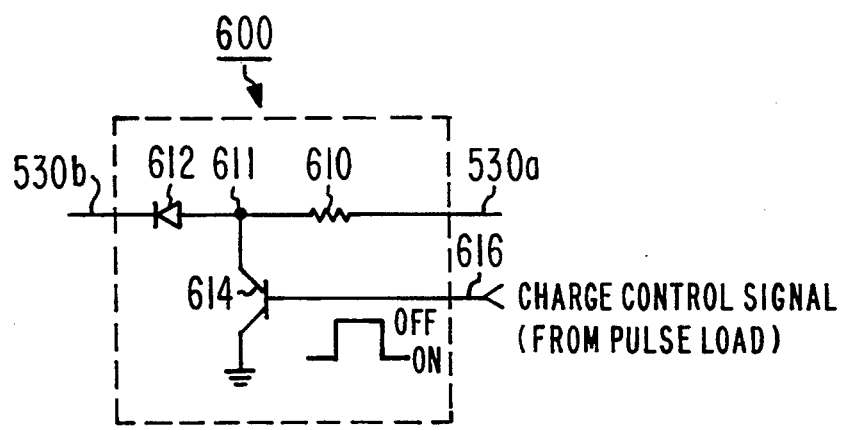
FIG. 6 is a simplified schematic diagram of a portion of the control circuit of FIG. 5, which modifies the high-voltage capacitor charge and discharge operation to be synchronized with the inter-load-pulse period and the load-pulse period, respectively.

FIG. 6 is a simplified block diagram of a charge control circuit which may be interposed between error amplifier 518 and comparators 540 and 542 of FIG. 5. Specifically, this may be accomplished by splitting conductive path 530 into two halves designated 530a and 530b, and interposing charge control circuit 600 of FIG. 6 into the circuit of FIG. 5. Referring to FIGS. 5 and 6, charge control circuit 600 includes the series combination of a resistor 610 having one end coupled to the anode of a diode 612 to define a junction therebetween. The end of resistor 610 remote from junction 611 is connected to conductor path 530a, and the cathode of diode 612 is connected to conductor 530b. This forms a path by which signal from error amplifier 518 can flow to the comparators. A bipolar NPN transistor 614 has its collector connected to junction 611, its emitter connected to ground, and its base connection 616 available to receive a charge control signal from the load circuit (not illustrated). The charge control signal is synchronized with the load pulse. When the charge control signal is logic low or zero volts, transistor 614 is nonconductive, and the error signal from error amplifier 518 is coupled to the inverting input terminal of comparator 540. When the charge control signal is a logic high level, corresponding to the base-to-emitter junction offset voltage, transistor 614 becomes conductive or saturated, and essentially applies the ground reference voltage to junction 611. With transistor 614 conductive, the signal path between error amplifier 518 and comparator 540 is broken, with the result that the voltage on the inverting input terminal of comparator 540 becomes equal to the voltage at the corresponding terminal of comparator 542, and the two comparators switch in-phase. This in-phase switching condition will be recognized as the condition under which, as described in conjunction with FIGS. 2a, 2b, and 2c, no voltage is induced in transformer secondary winding $14_s$, and, as a result, split capacitors 22 and 32 tend not to charge, or at least the capacitor charge is accomplished with energy which does not flow through the switching FETs. Thus, FET pairs 24 and 34 provide or carry the load energy during the load pulse, but do not supply capacitor recharge energy during the load pulse. Capacitor recharge energy is supplied by FET pairs 24 and 34 only during the inter-load-pulse interval.

FIG. 4b represents the split capacitor current $I_{Ce}$ during pulsed-load operation, with portion 414 representing the $T_{on}$ times in which relatively high-frequency load current pulses are supplied to the load (current below the zero-current line) by means of the in-phase switching of comparators 540 and 542 of FIG. 5 controlling the FET pairs 24, 34 of FIG. 1. Portions 416 of the plot of FIG. 4b represent the $T_{OFF}$ times during which the load pulse is absent, and capacitor recharge takes place with the aid of energy flowing through FET pairs 24, 34. FIG. 4c represents, by a plot 418, the sawtooth voltage across either of the split capacitors 22, 32 of FIG. 1, which decreases during the load pulse in the interval $T_0$–$T_1$, and which increases during the recharge interval $T_1$–$T_0$. The plot portions are marked "no Φ-shift" and "Φ-shifted" to indicate the regions in which the charge control circuit of FIG. 6 prevents and allows, respectively, phase shift to occur between the FET pairs.

Figure 7:
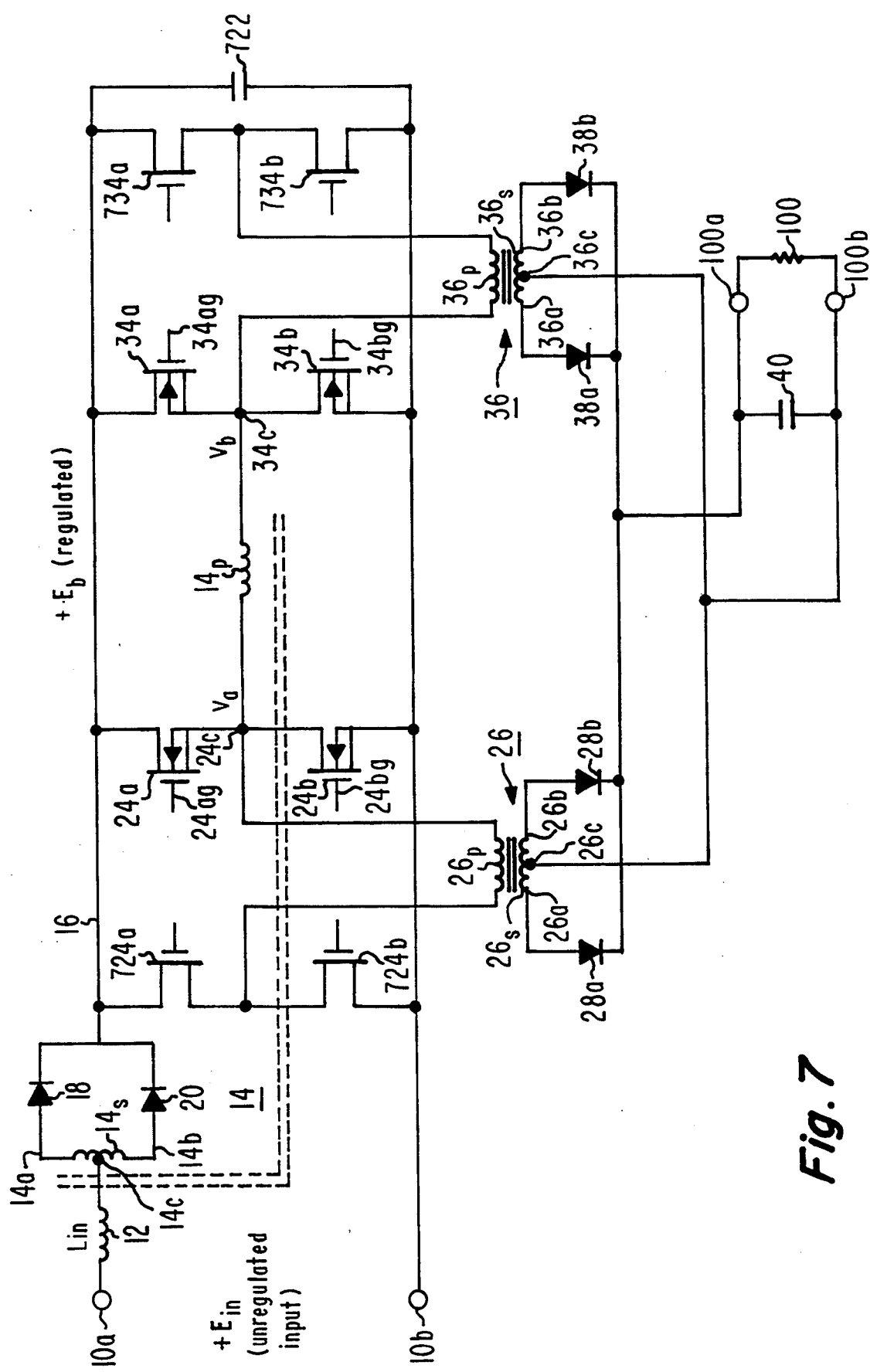
FIG. 7 is similar to FIG. 1, but the capacitors are not split, and additional controlled switches are provided.

An alternative embodiment of the invention uses one or more non-split capacitors 722 for high-voltage energy storage, as illustrated in FIG. 7, instead of split capacitors 22 and 32 as in the embodiment of FIG. 1. In FIG. 7, those terminals of transformer primary windings 26p and 36p which, in FIG. 1, are connected to capacitor taps 22c and 32c, respectively, are instead connected to the junctures of additional pairs of series-connected switches 724 and 734, each of which pairs is connected between bus 16 and reference ground. In the arrangement of FIG. 7, switch pairs 24, 724 are operated in synchronism but out-of-phase, and switch pairs 34, 734 are operated in synchronism but out-of-phase. The bus or output voltage is maintained by applying an error signal to control the phases of switches 24, 724 relative to switches 34, 734.

Other embodiments of the invention will be apparent to those skilled in the art. For example, while FETs have been described as being the controllable switches, and the charge control device has been described as NPN bipolar, any suitable switching devices may be used. If a lesser load power is required, capacitor 32, transformer 36 and rectifiers 38 may be dispensed with. While it is desirable to have zero inductance between split capacitors 22, 32 and the load, so as to most closely approximate an ideal capacitance multiplier, it is never possible to eliminate all inductance from the power flow paths, and particularly from the transformers, which tend to have leakage inductance.

What is claimed is:

1. A capacitance multiplying direct voltage regulator for generation, from a source of unregulated voltage, of a relatively high direct voltage across a capacitance, and for capacitance-multiplied coupling of the direct voltage to a load, said regulator comprising:

a first transformer including a primary winding and a secondary winding, one terminal of said secondary winding being coupled to a first terminal of said source of unregulated direct voltage;

a relatively high voltage bus;

first unidirectional current conducting means coupled to at least another terminal of said secondary winding of said first transformer and to said relatively high voltage bus, for preferentially conducting current in a particular direction between said source of unregulated voltage and said relatively high voltage bus;

a capacitor coupled between said relatively high voltage bus and a second terminal of said source of unregulated voltage, for storing charge at said relatively high voltage;

first and second series-connected controllable switches including a tap therebetween, said first and second series-connected switches being coupled between said relatively high voltage bus and said second terminal of said source of unregulated voltage;

third and fourth series-connected controllable switches including a tap therebetween, said third and fourth series-connected switches being coupled between said relatively high voltage bus and said second terminal of said source of unregulated voltage;

means for coupling a first terminal of said primary winding of said first transformer to said tap associated with said first and second controllable switches;

means for coupling a second terminal of said primary winding of said first transformer to said tap associated with said third and fourth controllable switches;

switching control means coupled to said first, second, third and fourth controllable switches, for switching said first and second controllable switches in mutual antiphase at a predetermined frequency, and for switching said third and fourth controllable switches in mutual antiphase at said predetermined frequency, but at a phase which is controlled, in response to an error signal, in relation to the phase of said switching of said first and second controllable switches, whereby, when said phase relation is an in-phase condition, no voltage appears across said secondary winding, and said secondary winding of said first transformer has no voltage induced thereacross, and said voltage of said relatively high voltage bus tends toward said unregulated voltage, and whereby, when said phase relation is other than said in-phase condition, a voltage appears across said secondary winding of said first transformer, which is summed with said unregulated voltage to produce said voltage on said relatively high voltage bus;

a step-down transformer including a primary winding and a secondary winding, said primary winding being connected to said tap between said first and second controllable switches, whereby a first alternating voltage, having a magnitude dependent upon said the magnitude of said voltage on said relatively high-voltage bus, is applied across said primary winding of said step-down transformer in response to said mutually antiphase switching of said first and second controllable switches, and a second alternating voltage, which has a peak magnitude which is relatively lower than said regulated direct voltage, is induced in said secondary winding of said step-down transformer;

second unidirectional current conducting means coupled to said secondary winding of said step-down transformer and to said load, for coupling direct current to said load in response to said relatively lower second alternating voltage; and error signal generating means coupled to said switching control means and to one of said load and said relatively high voltage bus, for comparing the voltage on said one of said load and said relatively high voltage bus with a reference voltage, for thereby forming a feedback loop, and for generating said error signal with a phase which makes said feedback loop degenerative, for tending to maintain near a fixed value the direct value of said one of said load voltage and said voltage across said relatively high voltage bus.

2. A regulator according to claim 1, wherein said secondary winding of said first transformer is center-tapped, whereby said secondary winding includes said center tap and first and second output terminals;

said one terminal of said secondary winding of said first transformer which is coupled to said first terminal of said source of unregulated direct voltage is said center tap; and said first unidirectional current conducting means comprises at least first and second rectifiers coupled to said first and second output terminals of said secondary winding of said first transformer.

3. A regulator according to claim 1, wherein said secondary winding of said step-down transformer includes a center tap and first and second output terminals;

one terminal of said secondary winding of said step-down transformer is coupled to a first terminal of said load of unregulated direct voltage is said center tap; and said first unidirectional current conducting means comprises at least first and second rectifiers coupled to said first and second output terminals of said secondary winding of said first transformer.

4. A regulator according to claim 1, wherein said capacitor is a split capacitor including first and second series-connected capacitors with a tap therebetween, whereupon a direct voltage appears at said tap; and wherein said primary winding of said step-down transformer is connected to said tap between said first and second series-connected capacitors as well as to said tap between said first and second controllable switches.

5. A regulator according to claim 4, further comprising:

a second capacitor including third and fourth series-connected capacitors with a tap therebetween, said second split capacitor being coupled between said relatively high voltage bus and said second terminal of said source of unregulated voltage;

a second step-down transformer including a primary winding and a secondary winding, said primary winding of said second step-down transformer being connected to said tap between said third and fourth series-connected capacitors and to said tap between said third and fourth controllable switches, whereby a third alternating voltage, having said magnitude dependent upon said regulated voltage, is applied across said primary winding of said second step-down transformer in response to said mutually antiphase switching of said third and fourth controllable switches, and a fourth alternating voltage, relatively lower in peak magnitude than said relatively higher direct voltage, is induced in said secondary winding of said step-down transformer; and third unidirectional current conducting means coupled to said secondary winding of said second step-down transformer and to said load, for coupling current from said secondary winding of said second step-down transformer to said load in response to said fourth relatively lower alternating voltage.

6. A regulator according to claim 1, wherein said load operates in a pulse mode, and wherein said switching control means includes means, coupled to said load, for setting said phase relation to said in-phase condition during said load pulse, and for allowing said other than in-phase condition during intervals between successive ones of said load pulses.

7. A capacitance multiplying direct voltage regulator for generation, across a capacitance, of a regulated direct voltage from an unregulated direct voltage source, and for capacitance-multiplied coupling of said regulated direct voltage to a load, said regulator comprising:

a first transformer including a primary winding and a secondary winding, one terminal of said secondary winding being coupled to a first terminal of said source of unregulated direct voltage;

a regulated relatively high voltage bus;

first unidirectional current conducting means coupled to at least another terminal of said secondary winding of said first transformer and to said regulated relatively high voltage bus, for preferentially conducting current in a particular direction between said source of unregulated voltage and said regulated relatively high voltage bus;

a split capacitor including first and second series-connected capacitors with a tap therebetween, said split capacitor being coupled between said regulated relatively high voltage bus and a second terminal of said source of unregulated voltage;

first and second series-connected controllable switches including a tap therebetween, said first and second series-connected switches being coupled between said regulated relatively high voltage bus and said second terminal of said source of unregulated voltage;

third and fourth series-connected controllable switches including a tap therebetween, said third and fourth series-connected switches being coupled between said regulated relatively high voltage bus and said second terminal of said source of unregulated voltage;

means for coupling a first terminal of said primary winding of said first transformer to said tap associated with said first and second controllable switches;

means for coupling a second terminal of said primary winding of said first transformer to said tap associated with said third and fourth controllable switches;

switching control means coupled to said first, second, third and fourth controllable switches, for switching said first and second controllable switches in mutual antiphase at a predetermined frequency, and for switching said third and fourth controllable switches in mutual antiphase at said predetermined frequency, but at a phase which is controlled, in response to an error signal, relative to the phase of said switching of said first and second controllable switches, whereby, when said phase relation is an in-phase condition, no voltage appears across said secondary winding, and said secondary winding of said first transformer has no voltage induced thereacross, and said regulated voltage of said relatively high voltage bus has approximately the same magnitude as said unregulated voltage, and whereby, when said phase relation is other than said in-phase condition, a voltage appears across said secondary winding of said first transformer, which is summed with said unregulated voltage to produce said regulated voltage on said relatively high voltage bus;

a step-down transformer including a primary winding and a secondary winding, said primary winding being connected to said tap between said first and second series-connected capacitors and to said tap between said first and second controllable switches, whereby a first alternating voltage, having a magnitude dependent upon said regulated voltage, is applied across said primary winding of said step-down transformer in response to said mutually antiphase switching of said first and second controllable switches, and a second alternating voltage, which has a peak magnitude which is relatively lower than said regulated direct voltage, is induced in said secondary winding of said step-down transformer;

second unidirectional current conducting means coupled to said secondary winding of said step-down transformer and to said load, for coupling direct current to said load in response to said relatively lower second alternating voltage; and error signal generating means coupled to said load and to said switching control means, for comparing the voltage across said load with a reference, for generating said error signal with a phase which forms a degenerative feedback loop tending to maintain the direct value of said load voltage near a fixed value.

8. A regulator according to claim 7, wherein said load operates in a pulse mode, and wherein said switching control means includes means, coupled to said load, for setting said phase relation to said in-phase condition during said load pulse, and for allowing said other than in-phase condition during intervals between successive ones of said load pulses.

9. The regulator according to claim 6 wherein said load is a solid-state pulse radar transmitter.

10. The regulator according to claim 7 wherein said load is a solid-state pulse radar transmitter.

* * * * *